Patented Aug. 18, 1953

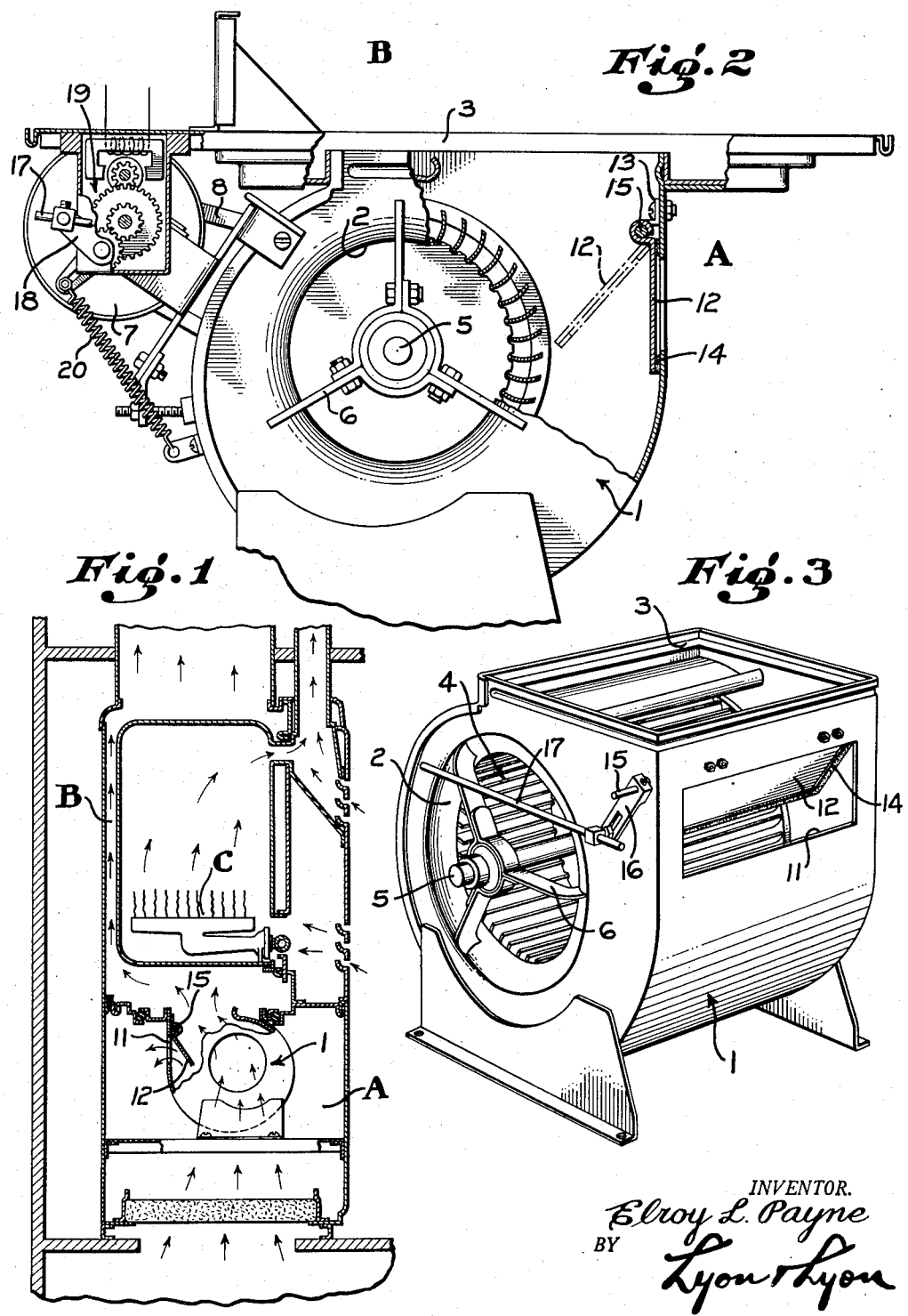

2,649,242

UNITED STATES PATENT OFFICE 2,649,242

VARIABLE CAPACITY BLOWER

El Roy L. Payne, Beverly Hills, Calif., assignor to Payne Beverly Manufacturing Co., Beverly Hills, Calif., a corporation of California Application June 30, 1951, Serial No. 234,551

2 Claims. (Cl. 230—114)

My invention relates to variable capacity blowers and is a continuation-in-part of my copending patent application, Serial No. 220,447, filed April 11, 1951.

Included in the objects of my invention are:

First, to provide a blower which is particularly suitable for use in conjunction with air heating or conditioning systems wherein the supply of air is varied commensurate with the change in the amount of heat added or subtracted in order that the temperature of the air as discharged into the room or other region to be heated or cooled, will not differ extremely from the desired temperature of the room or other region.

Second, to provide a blower of this type wherein a regulated portion of the air entering the blower is bypassed before discharge from the outlet end of the blower.

Third, to provide a blower of this type which lends itself to simple means of regulation or control from a remote point or in operative association with thermostats or other control means with which the blower is used.

Fourth, to provide a blower of this type which does not require any variable speed drive or change in configuration of the rotor or stator blades in order to vary its effective output.

With the above and other objects in view as may appear hereinafter, reference is directed to the accompanying drawings in which:

Figure 1 is a diagrammatical view of a furnace incorporating my blower.

Figure 2 is an enlarged partial section, partial elevational view of my blower and associated mechanism viewed in the opposite direction from Figure 1.

Figure 3 is a perspective view of my blower.

Various blowers of the squirrel cage type can be adapted to my invention. Blowers of this type include a shell 1 of scroll or spiral outline with parallel end walls. One or both of these end walls are provided with intake openings 2. An outlet opening 3 is directed substantially tangentially from the spiral contoured walls of the shell.

A rotor 4 is journaled within the shell. The rotor comprises an annular series of blades defining an open cylinder, suitably supported from a central shaft 5 which, in turn, is supported by an appropriate spider or bracket structure from the stationary parts of the blower. The shell 1 of the blower is usually designed so that, starting at one side of the discharge opening 3, the space between the blower shell and rotor progressively increases; hence the reason for the scroll or spiral form of the shell. The rotor is driven by a suitable electric motor 7 through a belt drive 8. The structure thus described may be considered as conventional.

In the exercise of my invention, I provide a bypass port 11 located adjacent to and substantially at right angles to the outlet opening 3. The bypass port 11 thus confronts the rotor 4. The bypass port is controlled by a gate 12. The gate is supported by a hinge 13 located at the side of the port adjacent the outlet opening and is preferably disposed within the shell 1. The gate thus swings inwardly toward the rotor and its open end is directed into the air stream issuing from the rotor. Thus, a portion of air will be deflected by the gate outwardly through the bypass port. The margins of the gate may be provided with a gasket 14 so as to seal substantially against the margins of the bypass opening when the gate is closed.

It will be observed that the effective output from the blower may be varied in proportion to the position of the gate. This arrangement lends itself to effective control by remotely responsive means. To accomplish this, the hinge may include a shaft 15 protruding from an end of the shell and equipped with an operating arm 16. The operating arm is adjustably connected to a rod 17 which joins a second operating arm 18 connected to a control motor 19. The control motor may take various forms, depending upon the type of control mechanism used in association with the furnace or air conditioning system, employing my variable capacity blower. In the present instance, the motor is shown as a small synchronous motor capable of stalling without injury. Thus, the motor may open the gate until a stop (not shown) is engaged to limit further movement. A spring 20 may effect return movement.

A typical installation of my variable capacity blower is shown in Figure 1 in which the blower is shown as mounted in an air intake compartment A with its discharge end directed into a heat exchanger B involving flow passages around a burner unit C. It will be observed that on opening of the gate 12, a portion of the air is bypassed and caused to recirculate in the intake chamber rather than be delivered to the heat exchanger. Thus, the effective output of the blower is reduced.

Having fully described my invention, it is to be understood that I do not wish to be limited to the details herein set forth, but my invention is of the full scope of the appended claims.

I claim:

1. A variable capacity blower construction for air heating and conditioning systems, comprising: an air intake compartment, a duct separated from the air intake compartment, and a blower mounted in said air intake compartment and discharging into said duct, said blower comprising: a cylindrical cage-type rotor; a scroll shell enveloping said rotor and defining an axially directed intake communicating between said intake compartment and the interior of said rotor, and an outlet substantially tangent to said rotor isolated from said intake compartment and communicating with said duct; said shell having a bypass opening adjacent said outlet communicating with said intake compartment to permit recirculation of air from said inlet to said bypass opening and back to said intake compartment; and a gate hinged to a margin of said bypass opening and directed into the air stream issuing from said rotor to deflect a portion of the air stream into said intake compartment.

2. A variable capacity blower construction for air heating and conditioning systems, comprising: an air intake compartment, a duct separated from the air intake compartment, and a blower mounted in said air intake compartment and discharging into said duct, said blower comprising: a cylindrical cage-type rotor; a scroll shell enveloping said rotor and defining an axially directed intake communicating between said intake compartment and the interior of said rotor, and an outlet substantially tangent to said rotor isolated from said intake compartment and communicating with said duct; said shell having a bypass opening adjacent said outlet communicating with said intake compartment to permit recirculation of air from said inlet to said bypass opening and back to said intake compartment; a gate hinged to a margin of said bypass opening and directed into the air stream issuing from said rotor to deflect a portion of the air stream into said intake compartment; and remote control means for operating said gate.

EL ROY L. PAYNE.

References Cited in the file of this patent

UNITED STATES PATENTS

| Number | Name | Date |
|---|---|---|
| 771,461 | Clifford | Oct. 4, 1904 |
| 960,815 | Carlisle | June 7, 1910 |
| 1,503,089 | Callahan | July 29, 1924 |
| 2,014,507 | Price | Sept. 17, 1935 |
| 2,089,969 | Kuenhold | Aug. 17, 1937 |
| 2,240,779 | Hunt | May 6, 1941 |
| 2,376,172 | Mueller | May 17, 1945 |
| 2,413,150 | McReynolds | Dec. 24, 1946 |
| 2,476,543 | Geissler | July 19, 1949 |

FOREIGN PATENTS

| Number | Country | Date |
|---|---|---|
| 114,100 | Germany | Oct. 11 1900 |